(12) United States Patent
Minamida et al.

(10) Patent No.: US 11,131,470 B2
(45) Date of Patent: Sep. 28, 2021

(54) INDOOR UNIT FOR REFRIGERATION APPARATUS

(71) Applicant: Daikin Industries, LTD., Osaka (JP)

(72) Inventors: Tomoatsu Minamida, Osaka (JP); Tomoyuki Haikawa, Osaka (JP); Shigeharu Taira, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 60 days.

(21) Appl. No.: 16/492,982

(22) PCT Filed: Mar. 28, 2018

(86) PCT No.: PCT/JP2018/012959
§ 371 (c)(1),
(2) Date: Sep. 11, 2019

(87) PCT Pub. No.: WO2018/181567
PCT Pub. Date: Oct. 4, 2018

(65) Prior Publication Data
US 2020/0018504 A1 Jan. 16, 2020

(30) Foreign Application Priority Data
Mar. 31, 2017 (JP) .............................. JP2017-072645

(51) Int. Cl.
*F24F 11/36* (2018.01)
*F25B 49/02* (2006.01)

(52) U.S. Cl.
CPC .............. *F24F 11/36* (2018.01); *F25B 49/02* (2013.01); *C09K 2205/40* (2013.01); *F25B 2313/009* (2013.01); *F25B 2600/2513* (2013.01)

(58) Field of Classification Search
CPC .............. C09K 2205/40; F24F 11/36; F25B 2313/009; F25B 2600/2513; F25B 49/02
See application file for complete search history.

(56) References Cited

U.S. PATENT DOCUMENTS

2002/0178738 A1* 12/2002 Taira ..................... F24F 11/89
62/129
2016/0091241 A1* 3/2016 Suzuki .................. F25D 17/067
62/186

FOREIGN PATENT DOCUMENTS

CN 1326075 A 12/2001
GB 2554267 A 3/2018
(Continued)

OTHER PUBLICATIONS

International Preliminary Report on Patentability and English translation of the Written Opinion of the International Searching Authority for International Application No. PCT/JP2018/012959, dated Oct. 10, 2019.
(Continued)

*Primary Examiner* — Henry T Crenshaw
(74) *Attorney, Agent, or Firm* — Birch, Stewart, Kolasch & Birch, LLP

(57) ABSTRACT

Provided is an indoor unit for a refrigeration apparatus that is capable of detecting a refrigerant leak while suppressing condensation on a refrigerant gas sensor. An indoor unit (50) for an air conditioner (100) including a refrigerant circuit (10) includes a casing (60), an indoor fan (53), and a refrigerant gas sensor (81). The refrigerant circuit (10) has refrigerant charged therein, and performs a refrigeration cycle. The casing (60) houses at least a portion of the refrigerant circuit (10), and has a blow-out port (64) that opens in a direction other than an up-down direction. The indoor fan (53) is housed in the casing (60), and generates an air flow (F) directed from the blow-out port (64) to
(Continued)

outside the casing (60). The refrigerant gas sensor (81) is capable of detecting a refrigerant gas below a bottom surface (63) of the casing (60).

8 Claims, 9 Drawing Sheets

(56) References Cited

FOREIGN PATENT DOCUMENTS

| | | | |
|---|---|---|---|
| JP | 6-180166 A | | 6/1994 |
| JP | 9-318208 A | | 12/1997 |
| JP | 2002-195718 A | | 7/2002 |
| JP | 2005 016822 | * | 1/2005 |
| JP | 2005-016822 | * | 1/2005 |
| JP | 2005-16822 A | | 1/2005 |
| JP | 2016-90109 A | | 5/2016 |
| JP | 2016-196996 A | | 11/2016 |
| JP | 2017-84656 A | | 5/2017 |
| WO | WO 2017/002215 A1 | | 1/2017 |

OTHER PUBLICATIONS

International Search Report for International Application No. PCT/JP2018/012959, dated Jun. 5, 2018, with English translation.
Extended European Search Report for European Application No. 18777191.0, dated Oct. 23, 2020.

* cited by examiner

INDOOR UNIT FOR REFRIGERATION APPARATUS

TECHNICAL FIELD

The present disclosure relates to an indoor unit for a refrigeration apparatus.

BACKGROUND ART

Recently, a refrigeration apparatus has been required to use a refrigerant having less environmental impact to suppress global warming. Refrigerants having less environmental impact than HFC (hydrofluorocarbon) refrigerants that are widely and conventionally used include low-GWP (global warming potential) refrigerants.

However, many of the low-GWP refrigerants have flammability.

Techniques have been devised that enable detection of a refrigerant leak to address a leak of refrigerant from a refrigeration apparatus. For example, in Patent Literature 1 (Japanese Unexamined Patent Application Publication No. 2016-90109), it is proposed that a floor-mounted indoor unit is provided with a refrigerant gas sensor at a position having the same height as that of a drain pan or below the drain pan and at a depth different from that of the drain pan to detect a leak of refrigerant having a greater specific gravity than air.

SUMMARY OF THE INVENTION

Technical Problem

Unlike the floor-mountable indoor unit described in Patent Literature 1, for example, in an indoor unit such as a wall-mountable indoor unit, if a refrigerant leak occurs during a shutdown over which no air is blown, because a wall-mountable indoor unit is not mounted around a floor surface, the leaking refrigerant does not build up around below a heat exchanger within the indoor unit, but leaks out of the indoor unit and reaches a lower area of an indoor space. If a refrigerant gas sensor were mounted midway in a blow-out airflow passage below the heat exchanger, the refrigerant gas sensor would be positioned at a location where air flow occurs during driving, which might cause condensation on the refrigerant gas sensor.

The present disclosure has been made in view of the foregoing point, and it is an object of the present disclosure to provide an indoor unit for a refrigeration apparatus that is capable of detecting a refrigerant leak while suppressing condensation on a refrigerant gas sensor.

Solution to Problem

An indoor unit for a refrigeration apparatus according to a first aspect is an indoor unit for a refrigeration apparatus including a refrigerant circuit, and includes a casing, a fan, and a refrigerant gas sensor. The refrigerant circuit has refrigerant charged therein and performs a refrigeration cycle. The casing houses at least a portion of the refrigerant circuit, and has a blow-out port that opens in a direction other than an up-down direction. The fan is housed in the casing, and generates an air flow directed from the blow-out port to outside the casing. The refrigerant gas sensor is capable of detecting a refrigerant gas below a lower surface of the casing or above an upper surface of the casing.

The refrigeration apparatus may be arranged over two spaces. For example, the refrigeration apparatus may be configured to have an indoor unit mounted in a room, and an outdoor unit mounted outside the room. Alternatively, for example, the refrigeration apparatus may be configured such that a portion thereof directed to the inside of a room and a portion thereof directed to the outside of the room are integrated into a single unit by a single casing.

In the indoor unit for the refrigeration apparatus, when a refrigerant having a greater specific gravity than air is used, the refrigerant gas sensor detects a refrigerant gas below the lower surface of the casing. When a refrigerant having a smaller specific gravity than air is used, the refrigerant gas sensor detects a refrigerant gas above the upper surface of the casing. Accordingly, a refrigerant leak can be detected.

In addition, the refrigerant gas sensor is configured to detect a refrigerant gas below the lower surface of the casing or above the upper surface of the casing, and is thus less likely to come into contact with the air flow directed from the blow-out port in the casing, which opens in a direction other than the up-down direction, to outside the casing. Accordingly, it is possible to prevent condensation from forming on the refrigerant gas sensor due to the conditioned air being brought into contact with the refrigerant gas sensor. It is therefore possible to detect a refrigerant leak while suppressing condensation on the refrigerant gas sensor.

An indoor unit for a refrigeration apparatus according to a second aspect is the indoor unit for the refrigeration apparatus according to the first aspect, wherein the refrigerant charged in the refrigerant circuit is a single-component refrigerant that is one of a flammable refrigerant, a low flammable refrigerant, a mildly flammable refrigerant, and a highly toxic refrigerant, or a refrigerant mixture of two or more thereof.

Examples of the flammable refrigerant include refrigerants classified in Class A3 of ASHRAE 34 Refrigerant Safety Classification. Examples of the low flammable refrigerant include refrigerants classified in Class A2 of ASHRAE 34 Refrigerant Safety Classification. Examples of the mildly flammable refrigerant include refrigerants classified in Class A2L of ASHRAE 34 Refrigerant Safety Classification. Examples of the highly toxic refrigerant include refrigerants classified in Class B of ASHRAE 34 Refrigerant Safety Classification.

In the indoor unit for the refrigeration apparatus, even when a refrigerant that has an ignition possibility or is likely to harm the human body when leaking is used in the refrigerant circuit, it is possible to detect a refrigerant leak while suppressing condensation on the refrigerant gas sensor.

An indoor unit for a refrigeration apparatus according to a third aspect is the indoor unit for the refrigeration apparatus according to the first aspect, wherein the refrigerant charged in the refrigerant circuit is R32 or a refrigerant with lower GWP than R32.

Examples of the refrigerant with lower GWP than R32 include a natural refrigerant such as R717 and, R170, R1270, R290, R600, R600a, R152a, and a refrigerant mixture thereof.

In the indoor unit for the refrigeration apparatus, even when a refrigerant with low GWP (global warming potential) is used in the refrigerant circuit, it is possible to detect a refrigerant leak while suppressing condensation on the refrigerant gas sensor.

An indoor unit for a refrigeration apparatus according to a fourth aspect is the indoor unit for the refrigeration apparatus according to any one of the first to third aspects, wherein the refrigerant gas sensor detects a refrigerant gas in an area ranging from 30 mm to 300 mm below the lower surface of the casing. The indoor unit for the refrigeration apparatus is used with the casing secured to a wall surface of a room.

The casing is secured to the wall surface of the room, which allows the indoor unit for the refrigeration apparatus to be used with the casing secured in a position upwardly away from the floor surface. When a refrigerant having a greater specific gravity than air is used in the refrigeration apparatus, refrigerant that has leaked is found to form a flammable region in an area below the lower surface of the casing of the indoor unit. To address this, in the indoor unit for the refrigeration apparatus, the refrigerant gas sensor detects a refrigerant gas in an area ranging from 30 mm to 300 mm below the lower surface of the casing. Accordingly, it is possible to accurately detect a refrigerant leak when a refrigerant having a greater specific gravity than air is used.

An indoor unit for a refrigeration apparatus according to a fifth aspect is the indoor unit for the refrigeration apparatus according to the fourth aspect, wherein the refrigerant gas sensor is secured in an area ranging from 30 mm to 300 mm below the lower surface of the casing.

In the indoor unit for the refrigeration apparatus, since the refrigerant gas sensor is secured in an area ranging from 30 mm to 300 mm below the lower surface of the casing, it is possible to always detect any refrigerant in an area below the lower surface of the casing.

An indoor unit for a refrigeration apparatus according to a sixth aspect is the indoor unit for the refrigeration apparatus according to the fourth aspect, further including a control unit. The control unit causes the refrigerant gas sensor to detect a refrigerant gas while stopping driving of the fan.

In the indoor unit for the refrigeration apparatus, while the driving of the fan is stopped, refrigerant that has leaked is less likely to be blown out of the blow-out port in the casing, and is in particular likely to build up beneath the lower surface of the casing. To address this, in the indoor unit for the refrigeration apparatus, the control unit causes the refrigerant gas sensor to detect a portion where refrigerant is in particular likely to build up, with the driving of the fan being stopped. It is thus possible to accurately detect a refrigerant leak when a refrigerant having a greater specific gravity than air is used.

An indoor unit for a refrigeration apparatus according to a seventh aspect is the indoor unit for the refrigeration apparatus according to the sixth aspect, further including a raising and lowering mechanism. The raising and lowering mechanism is a mechanism for allowing the refrigerant gas sensor to move downward from the lower surface of the casing and into the casing. The control unit causes the raising and lowering mechanism to lower the refrigerant gas sensor to a position 30 mm or more and 300 mm or less below the lower surface of the casing while stopping the driving of the fan, and causes the refrigerant gas sensor to detect a refrigerant gas.

In the indoor unit for the refrigeration apparatus, while the driving of the fan is stopped, refrigerant that has leaked is less likely to move out of the blow-out port in the casing, and is in particular likely to build up beneath the lower surface of the casing. To address this, in the indoor unit for the refrigeration apparatus, the control unit causes the raising and lowering mechanism to lower the refrigerant gas sensor to a position 30 mm or more and 300 mm or less below the lower surface of the casing, with the driving of the fan being stopped. The refrigerant gas sensor is moved to a portion where refrigerant is in particular likely to build up. It is thus possible to accurately detect a refrigerant leak when a refrigerant having a greater specific gravity than air is used.

DESCRIPTION OF EMBODIMENTS

The following describes an indoor unit 50 for an air conditioner 100, which is an indoor unit for a refrigeration apparatus according to an embodiment, with reference to the drawings. It should be noted that the following embodiment is a specific example and is not intended to limit the disclosure, but can be modified, as appropriate, without departing from the scope of the disclosure.

(1) Air Conditioner 100

Figure 1:
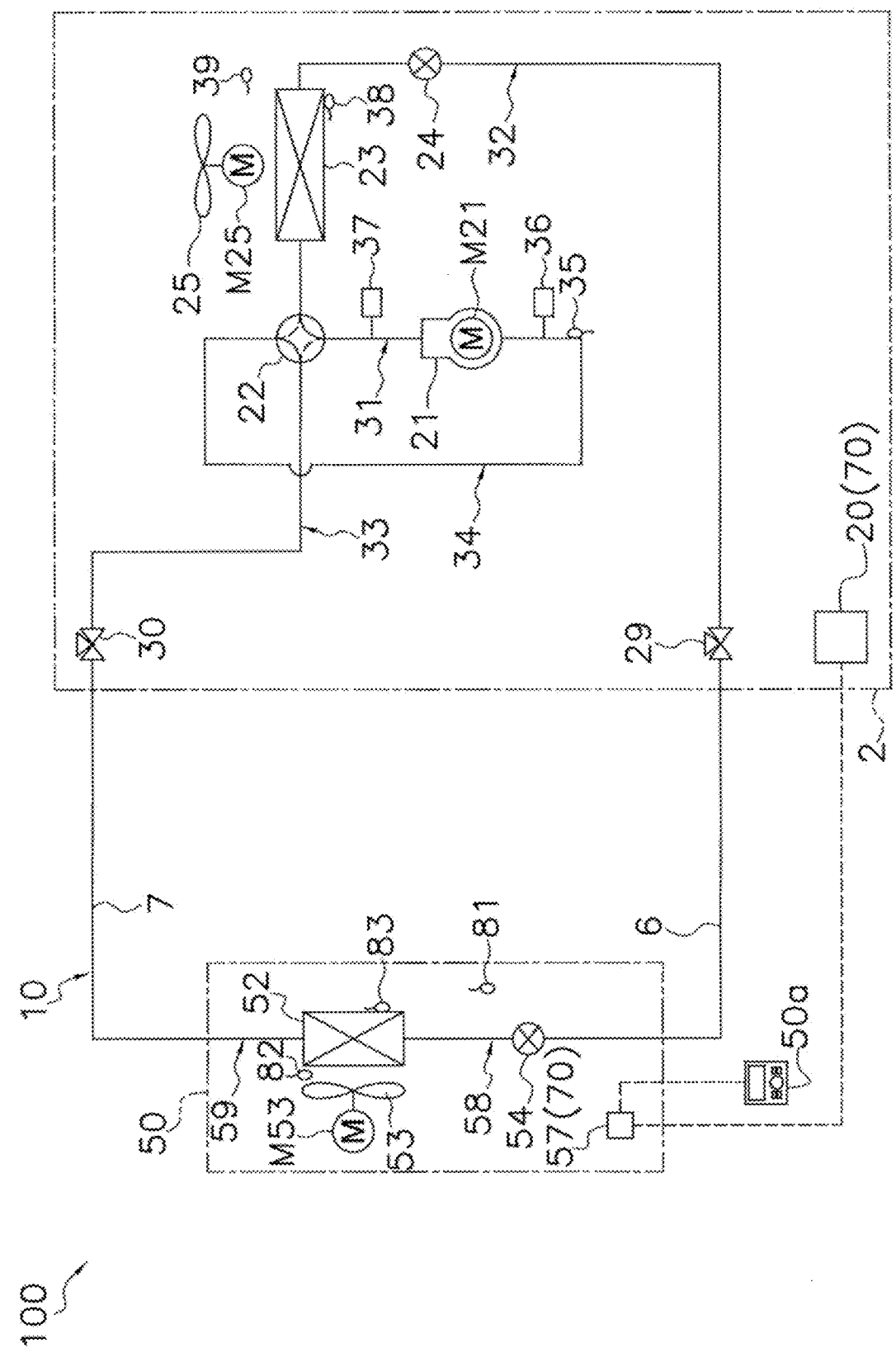
FIG. 1 is an overall configuration diagram of an air conditioner.

FIG. 1 is a schematic configuration diagram of the air conditioner 100 according to an embodiment. The air conditioner 100 is an apparatus that performs air conditioning of a target space by performing a vapor-compression refrigeration cycle.

The air conditioner 100 mainly includes an outdoor unit 2, the indoor unit 50, a liquid-refrigerant connection pipe 6 and a gas-refrigerant connection pipe 7 that connect the outdoor unit 2 and the indoor unit 50, a plurality of remote controls 50a, each of which serves as an input device and an output device, and a controller 70 that controls the operation of the air conditioner 100.

In the air conditioner 100, a refrigeration cycle is performed such that refrigerant charged in a refrigerant circuit 10 is compressed, cooled or condensed, decompressed, heated or evaporated, and then compressed again. In this embodiment, the refrigerant circuit 10 is filled with R32 as a refrigerant for a vapor-compression refrigeration cycle.

(1-1) Outdoor Unit 2

The outdoor unit 2 is connected to the indoor unit 50 through the liquid-refrigerant connection pipe 6 and the gas-refrigerant connection pipe 7 and forms a portion of the refrigerant circuit 10. The outdoor unit 2 mainly includes a compressor 21, a four-way switching valve 22, an outdoor heat exchanger 23, an outdoor expansion valve 24, an outdoor fan 25, a liquid-side shutoff valve 29, and a gas-side shutoff valve 30.

The outdoor unit 2 further includes pipes constituting the refrigerant circuit 10, namely, a discharge pipe 31, a suction pipe 34, an outdoor gas-side pipe 33, and an outdoor liquid-side pipe 32. The discharge pipe 31 connects the discharge side of the compressor 21 and a first connection port of the four-way switching valve 22. The suction pipe 34 connects the suction side of the compressor 21 and a second connection port of the four-way switching valve 22. The outdoor gas-side pipe 33 connects a third connection port of the four-way switching valve 22 and the gas-side shutoff valve 30. The outdoor liquid-side pipe 32 extends from a fourth connection port of the four-way switching valve 22 to the liquid-side shutoff valve 29 through the outdoor heat exchanger 23 and the outdoor expansion valve 24.

The compressor 21 is a device that compresses a low-pressure refrigerant in the refrigeration cycle to a high-pressure refrigerant. The compressor 21 is implemented here as a hermetically sealed compressor in which a positive displacement compression element (not illustrated), such as a rotary or scroll compression element, is driven to rotate by a compressor motor M21. The compressor motor M21 is used to change volume and has an operating frequency that can be controlled by an inverter.

The connection state of the four-way switching valve 22 can be switched to switch the four-way switching valve 22 between a cooling-operation connection state in which the suction side of the compressor 21 and the gas-side shutoff valve 30 are connected while the discharge side of the compressor 21 and the outdoor heat exchanger 23 are connected and a heating-operation connection state in which the suction side of the compressor 21 and the outdoor heat exchanger 23 are connected while the discharge side of the compressor 21 and the gas-side shutoff valve 30 are connected.

The outdoor heat exchanger 23 is a heat exchanger that functions as a radiator for a high-pressure refrigerant in the refrigeration cycle during a cooling operation and that functions as an evaporator for a low-pressure refrigerant in the refrigeration cycle during a heating operation.

The outdoor fan 25 generates an air flow for sucking outdoor air into the outdoor unit 2, allowing the air to exchange heat with the refrigerant in the outdoor heat exchanger 23, and then discharging the air to the outside. The outdoor fan 25 is driven to rotate by an outdoor fan motor M25.

The outdoor expansion valve 24 is an electric expansion valve whose valve opening degree is controllable, and is disposed midway in the outdoor liquid-side pipe 32 between the outdoor heat exchanger 23 and the liquid-side shutoff valve 29.

The liquid-side shutoff valve 29 is a manual valve that is arranged in a connecting portion between the outdoor liquid-side pipe 32 and the liquid-refrigerant connection pipe 6.

The gas-side shutoff valve 30 is a manual valve that is arranged in a connecting portion between the outdoor gas-side pipe 33 and the gas-refrigerant connection pipe 7.

The outdoor unit 2 has various sensors arranged therein.

Specifically, the outdoor unit 2 has arranged, near the compressor 21, a suction temperature sensor 35 to detect a suction temperature that is the temperature of refrigerant on the suction side of the compressor 21, a suction pressure sensor 36 to detect a suction pressure that is the pressure of refrigerant on the suction side of the compressor 21, and a discharge pressure sensor 37 to detect a discharge pressure that is the pressure of refrigerant on the discharge side of the compressor 21.

The outdoor heat exchanger 23 is also provided with an outdoor heat-exchange temperature sensor 38 to detect the temperature of refrigerant flowing through the outdoor heat exchanger 23.

Further, an outside air temperature sensor 39 is arranged near the outdoor heat exchanger 23 or the outdoor fan 25 to detect the temperature of outdoor air that is sucked into the outdoor unit 2.

The outdoor unit 2 includes an outdoor-unit control unit 20 that controls the operation of components of the outdoor unit 2. The outdoor-unit control unit 20 has a microcomputer including a CPU, a memory, and so on. The outdoor-unit control unit 20 is connected to an indoor-unit control unit 57 of indoor unit 50 via a communication line, and transmits and receives control signals and the like. Further, the outdoor-unit control unit 20 is electrically connected to the suction temperature sensor 35, the suction pressure sensor 36, the discharge pressure sensor 37, the outdoor heat-exchange temperature sensor 38, and the outside air temperature sensor 39, and receives a signal from each of the sensors.

(1-2) Indoor Unit 50

Figure 3:
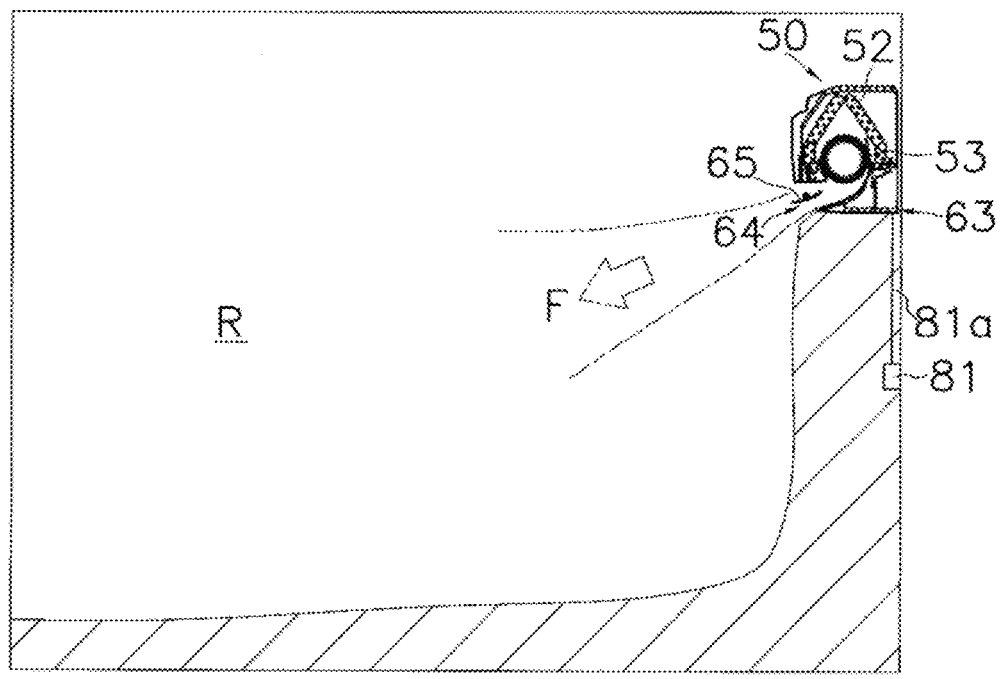
FIG. 3 is a diagram illustrating how a wall-mountable indoor unit is mounted on the wall surface of a room.

As illustrated in FIG. 3, the indoor unit 50 is mounted on the wall surface of a room R, which is the target space. The indoor unit 50 is connected to the outdoor unit 2 through the liquid-refrigerant connection pipe 6 and the gas-refrigerant connection pipe 7 and forms a portion of the refrigerant circuit 10.

The indoor unit 50 includes an indoor expansion valve 54, an indoor heat exchanger 52, an indoor fan 53, a casing 60, and so on.

The indoor unit 50 further includes an indoor liquid refrigerant pipe 58 that connects the liquid-side end of the indoor heat exchanger 52 and the liquid-refrigerant connection pipe 6, and an indoor gas refrigerant pipe 59 that connects the gas-side end of the indoor heat exchanger 52 and the gas-refrigerant connection pipe 7.

The indoor expansion valve 54 is an electric expansion valve whose valve opening degree is controllable, and is disposed midway in the indoor liquid refrigerant pipe 58.

The indoor heat exchanger 52 is a heat exchanger that functions as an evaporator for a low-pressure refrigerant in the refrigeration cycle during a cooling operation and that functions as a radiator for a high-pressure refrigerant in the refrigeration cycle during a heating operation.

The indoor fan 53 generates an air flow for sucking indoor air into the casing 60 of the indoor unit 50, allowing the air to exchange heat with the refrigerant in the indoor heat exchanger 52, and then discharging the air to the outside. The indoor fan 53 is driven to rotate by an indoor fan motor M53.

The indoor unit 50 has various sensors arranged therein.

Specifically, the casing 60 of the indoor unit 50 has arranged therein an air temperature sensor 82 to detect the air temperature in the space where the indoor unit 50 is installed, and an indoor heat-exchange temperature sensor 83 to detect the temperature of refrigerant flowing through the indoor heat exchanger 52.

Further, a refrigerant gas sensor 81 (e.g., a sensor that electrically reacts differently in accordance with the refrigerant gas concentration) is disposed outside the casing 60 of the indoor unit 50 to detect, when the refrigerant gas charged in the refrigerant circuit 10 leaks, the concentration of the leaking refrigerant. The refrigerant gas sensor 81 is connected to the indoor-unit control unit 57 via a communication line 81a. As described below, the refrigerant gas sensor 81 is located below a bottom surface 63 of the casing 60 of the indoor unit 50.

Further, the indoor unit 50 includes the indoor-unit control unit 57, which controls the operation of components of the indoor unit 50. The indoor-unit control unit 57 has a microcomputer including a CPU, a memory, and so on. The indoor-unit control unit 57 is connected to the outdoor-unit control unit 20 via a communication line, and transmits and receives control signals and the like.

The indoor-unit control unit 57 is electrically connected to the refrigerant gas sensor 81, the air temperature sensor 82, and the indoor heat-exchange temperature sensor 83, and receives a signal from each of the sensors.

Figure 4:
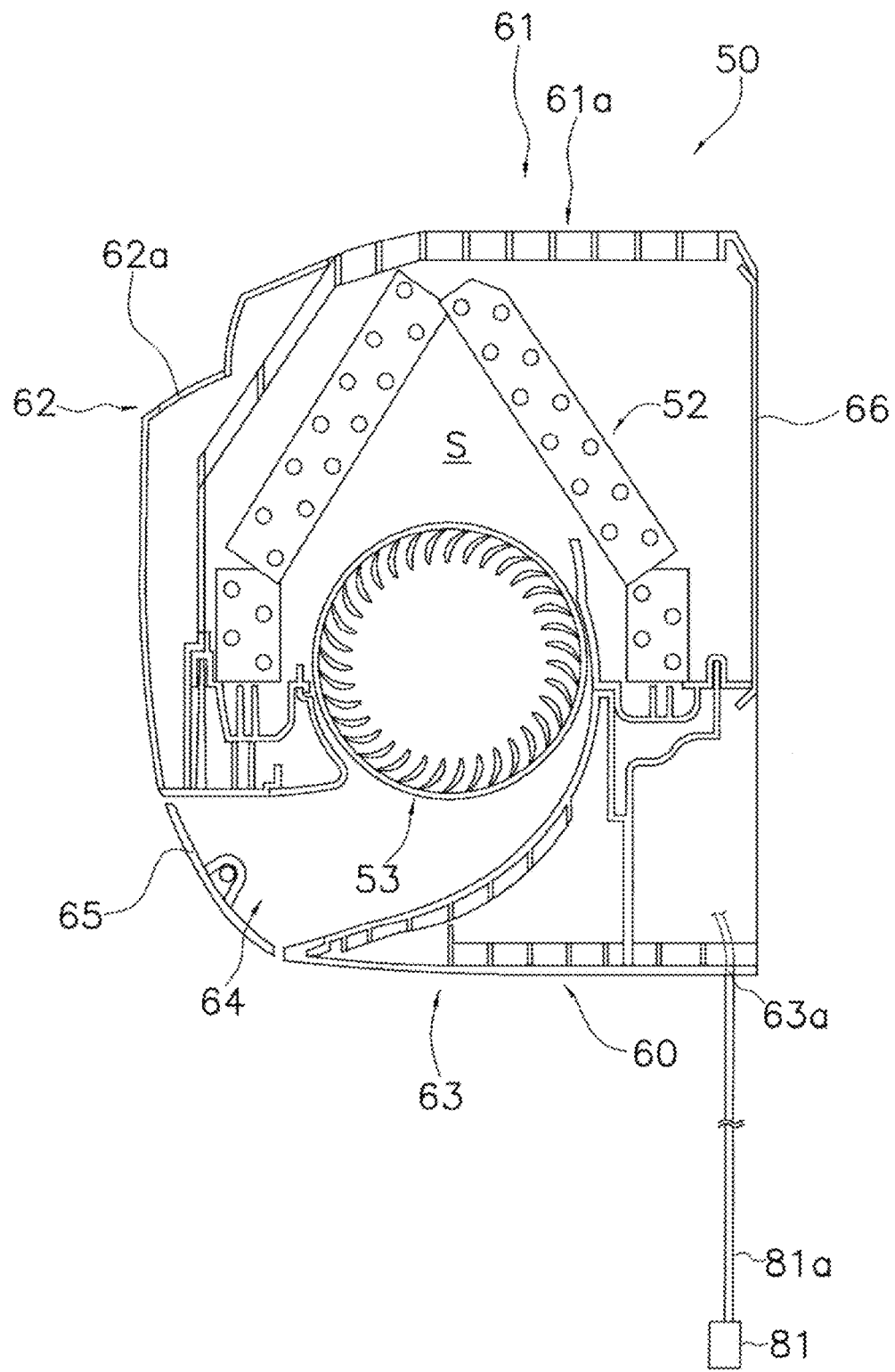
FIG. 4 is a sectional view of the indoor unit when viewed in side elevation.

The casing 60 is a substantially rectangular parallelepiped housing that houses the indoor heat exchanger 52, the indoor fan 53, the indoor expansion valve 54, the sensors 82 and 83, and the indoor-unit control unit 57. As illustrated in FIG. 3 and FIG. 4, the casing 60 houses the indoor heat exchanger 52 in a position such that the indoor heat exchanger 52 has a substantially inversely V-shaped cross section when viewed in side elevation, and houses the indoor fan 53, which is a cross flow fan, in such a manner that the axial direction of the indoor fan 53 corresponds to the left-right direction.

As illustrated in FIG. 3 and FIG. 4, the casing 60 has a top surface 61 that forms an upper edge of the casing 60, a front panel 62 that forms a front portion of the casing 60, the bottom surface 63 that forms a bottom portion of the casing 60, a blow-out port 64, a louver 65, left and right side surfaces (not illustrated), and so on. The casing 60 is secured to the wall surface of the room R through a mounting plate 66, which is disposed on the back surface side of the casing 60.

The top surface 61 has a plurality of top-surface suction ports 61a that open in the up-down direction. The front panel 62 is a panel that extends downward from near the front-side edge of the top surface 61. The front panel 62 has disposed in an upper portion thereof a front suction port 62a that is a long and narrow opening elongated in the left-right direction. The air in the room R passes through the top-surface suction ports 61a and the front suction port 62a and is taken into an air flow path S that is a space in the casing 60 where the indoor heat exchanger 52 and the indoor fan 53 are contained.

The bottom surface 63 extends substantially horizontally below the indoor heat exchanger 52 and the indoor fan 53. The bottom surface 63 has an opening 63a through which the communication line 81a connecting the refrigerant gas sensor 81 and the indoor-unit control unit 57 is allowed to extend in the up-down direction.

The blow-out port 64 is disposed in a front lower portion of the casing 60, which is located in a lower portion of the front panel 62 and at the front of the bottom surface 63, in such a manner as to open forward and downward. The blow-out port 64 is a long and narrow opening elongated in the left-right direction. The blow-out port 64 communicates with the top-surface suction ports 61a and the front suction port 62a through the air flow path S, which is a space where the indoor heat exchanger 52 and the indoor fan 53 are contained. Thus, air in an air-conditioning room, which is sucked through the top-surface suction ports 61a and the front suction port 62a, is introduced to the air flow path S and travels through the indoor heat exchanger 52. Then, the air pressure raised by the indoor fan 53 is blown out into the air-conditioning room through the blow-out port 64. The louver 65 is disposed in the blow-out port 64 to change the flow direction of air to be blown out into the air-conditioning room.

It should be noted that, as illustrated in FIG. 3, the refrigerant gas sensor 81 described above is arranged such that conditioned air F flowing through the air flow path S and the blow-out port 64 in the casing 60 is not brought into direct contact with the refrigerant gas sensor 81. Specifically, the air conditioned in the indoor unit 50 flows forward and downward through the blow-out port 64 in the casing 60, whereas the refrigerant gas sensor 81 is secured in a position not included in an area through which the conditioned air F flows.

More specifically, the refrigerant gas sensor 81 is disposed at a position in an area ranging from 30 mm to 300 mm below the bottom surface 63 of the casing 60 and is secured to the side surface of the room R.

(1-3) Remote Control 50a

The remote control 50a is an input device used by the user of the indoor unit 50 to input various instructions to switch the operating state of the air conditioner 100. The remote control 50a also functions as an output device for informing the user of the operating state of the air conditioner 100 or providing a predetermined notification. The remote control 50a and the indoor-unit control unit 57 are connected via a communication line and transmit and receive signals to and from each other. The remote control 50a has a built-in speaker.

(2) Details of Controller 70

In the air conditioner 100, the outdoor-unit control unit 20 and the indoor-unit control unit 57, which are connected via a communication line, form the controller 70 that controls the operation of the air conditioner 100.

Figure 2:
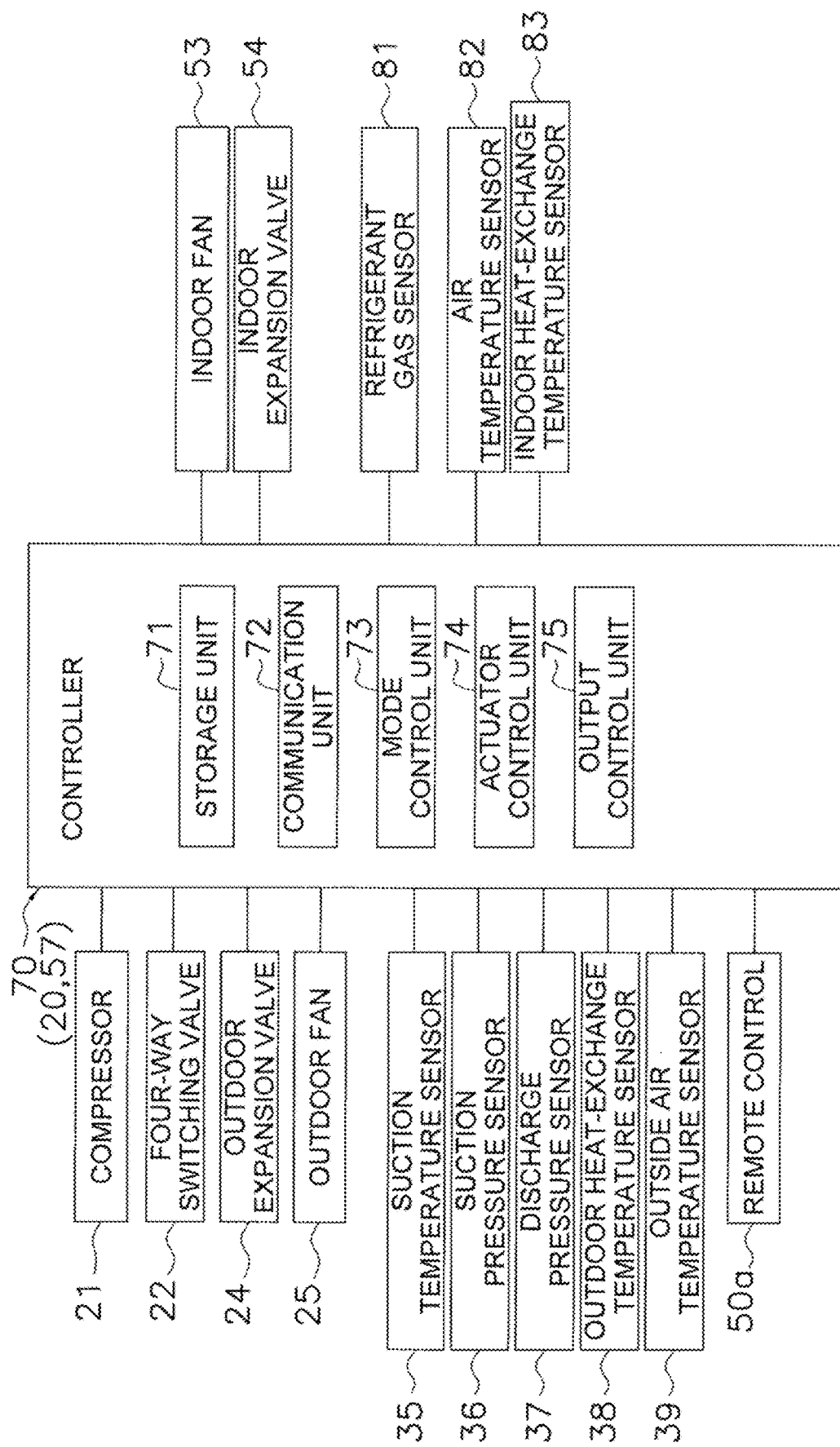
FIG. 2 is a block diagram schematically illustrating the general configuration of a controller and components connected to the controller.

FIG. 2 is a block diagram schematically illustrating the general configuration of the controller 70 and components connected to the controller 70.

The controller 70 has a plurality of control modes, and controls the operation of the air conditioner 100 in accordance with the control modes. For example, the controller 70 has, as the control modes, a normal operation mode, which is executed under normal conditions, and a refrigerant leak control mode, which is executed when a refrigerant leak occurs.

The controller 70 is electrically connected to the actuators included in the outdoor unit 2 (specifically, the compressor 21 (the compressor motor M21), the outdoor expansion valve 24, and the outdoor fan 25 (the outdoor fan motor M25)) and the various sensors included in the outdoor unit 2 (such as the suction temperature sensor 35, the suction pressure sensor 36, the discharge pressure sensor 37, the outdoor heat-exchange temperature sensor 38, and the outside air temperature sensor 39). The controller 70 is also electrically connected to the actuators included in the indoor unit 50 (specifically, the indoor fan 53 (the indoor fan motor M53) and the indoor expansion valve 54). Further, the controller 70 is electrically connected to the refrigerant gas sensor 81, the air temperature sensor 82, the indoor heat-exchange temperature sensor 83, and the remote control 50a. In particular, the refrigerant gas sensor 81 is connected to the indoor-unit control unit 57 via the communication line 81a and is thus connected to the controller 70.

The controller 70 mainly includes a storage unit 71, a communication unit 72, a mode control unit 73, an actuator control unit 74, and an output control unit 75. These components in the controller 70 are implemented by the integrated functioning of the components included in the outdoor-unit control unit 20 and/or the indoor-unit control unit 57.

(2-1) Storage Unit 71

The storage unit 71 is constituted by, for example, a ROM, a RAM, a flash memory, and so on and includes a volatile storage area and a non-volatile storage area. The storage unit 71 stores a control program that defines processes performed by the components of the controller 70. The storage unit 71 further stores predetermined information (such as values detected by sensors and commands input to the remote control 50a) in predetermined storage areas, as appropriate, by using the components of the controller 70.

(2-2) Communication Unit 72

The communication unit 72 is a function unit that serves as a communication interface for transmitting and receiving signals to and from devices connected to the controller 70. The communication unit 72 transmits a predetermined signal to a designated actuator upon receipt of a request from the actuator control unit 74. Further, upon receipt of a signal output from each of the sensors 35 to 39 and 81 to 83 and the remote control 50a, the communication unit 72 stores the signal in a predetermined storage area of the storage unit 71.

(2-3) Mode Control Unit 73

The mode control unit 73 is a function unit that performs processing such as switching between the control modes. When a predetermined refrigerant leak condition is not satisfied for indoor unit 50, the mode control unit 73 sets the control mode to the normal operation mode. On the other hand, when the predetermined refrigerant leak condition is satisfied for the indoor unit 50, the mode control unit 73 switches the control mode to the refrigerant leak control mode.

(2-4) Actuator Control Unit 74

The actuator control unit 74 controls the operation of the actuators (such as the compressor 21) included in the air conditioner 100 in accordance with the control program.

For example, in the normal operation mode, the actuator control unit 74 controls the number of revolutions of the compressor 21, the numbers of revolutions of the outdoor fan 25 and the indoor fan 53, the valve opening degree of the outdoor expansion valve 24, the valve opening degree of the indoor expansion valve 54, and the like in real time in accordance with a set temperature, values detected by various sensors, and so on.

In the refrigerant leak control mode, the actuator control unit 74 controls the operation of the actuators so that a predetermined operation can be performed. Specifically, when refrigerant leaks, the actuator control unit 74 interrupts the supply of refrigerant to the indoor unit 50.

(2-5) Output Control Unit 75

The output control unit 75 is a function unit that controls the operation of the remote control 50a, which serves as a display device.

The output control unit 75 causes the remote control 50a to output predetermined information so as to present information related to the operating state or conditions to an administrator.

For example, during the execution of the cooling operation mode in the normal operation mode, the output control unit 75 causes the remote control 50a to display various kinds of information such as a set temperature.

In the refrigerant leak control mode, the output control unit 75 causes a display of the remote control 50a to display information indicating the occurrence of a refrigerant leak. Further, the output control unit 75 provides an audible notification indicating the occurrence of a refrigerant leak by using the built-in speaker of the remote control 50a. The output control unit 75 further causes the remote control 50a to display information to promote notification to a service engineer.

(3) Normal Operating Mode

The following describes the normal operation mode.

The normal operation mode includes a cooling operation mode and a heating operation mode.

The controller 70 determines and performs the cooling operation mode or the heating operation mode in accordance with an instruction received from the remote control 50a or the like.

(3-1) Cooling Operation Mode

In the air conditioner 100, in the cooling operation mode, the connection state of the four-way switching valve 22 is set to a cooling-operation connection state in which the suction side of the compressor 21 and the gas-side shutoff valve 30 are connected while the discharge side of the compressor 21 and the outdoor heat exchanger 23 are connected. The refrigerant with which the refrigerant circuit 10 is filled is mainly circulated in the order of the compressor 21, the outdoor heat exchanger 23, the outdoor expansion valve 24, the indoor expansion valve 54, and the indoor heat exchanger 52.

More specifically, when the cooling operation mode is started, in the refrigerant circuit 10, the refrigerant is sucked into the compressor 21, compressed, and then discharged. A low pressure in the refrigeration cycle corresponds to a suction pressure detected by the suction pressure sensor 36, and a high pressure in the refrigeration cycle corresponds to a discharge pressure detected by the discharge pressure sensor 37.

In the compressor 21, capacity control is performed in accordance with cooling load required for the indoor unit 50. Specifically, a target value of the suction pressure is set in accordance with the cooling load required for the indoor unit 50, and the operating frequency of the compressor 21 is controlled such that the suction pressure becomes equal to the target value.

The gas refrigerant discharged from the compressor 21 travels through the discharge pipe 31 and the four-way switching valve 22, and flows into the gas-side end of the outdoor heat exchanger 23.

The gas refrigerant that has flowed into the gas-side end of the outdoor heat exchanger 23 releases heat and condenses into a liquid refrigerant in the outdoor heat exchanger 23 by exchanging heat with outdoor-side air supplied by the outdoor fan 25. The liquid refrigerant flows out of the liquid-side end of the outdoor heat exchanger 23.

The liquid refrigerant that has flowed out of the liquid-side end of the outdoor heat exchanger 23 travels through the outdoor liquid-side pipe 32, the outdoor expansion valve 24, the liquid-side shutoff valve 29, and the liquid-refrigerant connection pipe 6, and flows into the indoor unit 50. In the cooling operation mode, the outdoor expansion valve 24 is controlled to be fully opened.

The refrigerant that has flowed into the indoor unit 50 travels through a portion of the indoor liquid refrigerant pipe 58, and flows into the indoor expansion valve 54. The refrigerant that has flowed into the indoor expansion valve 54 is decompressed by the indoor expansion valve 54 until the refrigerant becomes a low-pressure refrigerant in the refrigeration cycle, and then flows into the liquid-side end of the indoor heat exchanger 52. In the cooling operation mode, the valve opening degree of the indoor expansion valve 54 is controlled such that the degree of superheating of refrigerant sucked into the compressor 21 becomes equal to a predetermined degree of superheating. The degree of superheating of refrigerant sucked into the compressor 21 is calculated by the controller 70 by using the temperature detected by the suction temperature sensor 35 and the pressure detected by the suction pressure sensor 36. The refrigerant that has flowed into the liquid-side end of the indoor heat exchanger 52 evaporates into a gas refrigerant in the indoor heat exchanger 52 by exchanging heat with indoor air supplied by the indoor fan 53. The gas refrigerant flows out of the gas-side end of the indoor heat exchanger 52. The gas refrigerant that has flowed out of the gas-side end of the indoor heat exchanger 52 flows to the gas-refrigerant connection pipe 7 through the indoor gas refrigerant pipe 59.

In this way, the refrigerant flowing through the gas-refrigerant connection pipe 7 travels through the gas-side shutoff valve 30, the outdoor gas-side pipe 33, the four-way switching valve 22, and the suction pipe 34, and is again sucked into the compressor 21.

(3-2) Heating Operation Mode

In the air conditioner 100, in the heating operation mode, the connection state of the four-way switching valve 22 is set to a heating-operation connection state in which the suction side of the compressor 21 and the outdoor heat exchanger 23 are connected while the discharge side of the compressor 21 and the gas-side shutoff valve 30 are connected. The refrigerant with which the refrigerant circuit 10 is filled is mainly circulated in the order of the compressor 21, the indoor heat exchanger 52, the indoor expansion valve 54, the outdoor expansion valve 24, and the outdoor heat exchanger 23.

More specifically, when the heating operation mode is started, in the refrigerant circuit 10, the refrigerant is sucked into the compressor 21, compressed, and then discharged. A low pressure in the refrigeration cycle corresponds to a suction pressure detected by the suction pressure sensor 36, and a high pressure in the refrigeration cycle corresponds to a discharge pressure detected by the discharge pressure sensor 37.

In the compressor 21, capacity control is performed in accordance with the heating load required for the indoor unit 50. Specifically, a target value of the discharge pressure is set in accordance with the heating load required for the indoor unit 50, and the operating frequency of the compressor 21 is controlled such that the discharge pressure becomes equal to the target value.

The gas refrigerant discharged from the compressor 21 flows through the discharge pipe 31, the four-way switching valve 22, the outdoor gas-side pipe 33, and the gas-refrigerant connection pipe 7, and then flows into the indoor unit 50 through the indoor gas refrigerant pipe 59.

The refrigerant that has flowed into the indoor unit 50 travels through the indoor gas refrigerant pipe 59, and flows into the gas-side end of the indoor heat exchanger 52. The refrigerant that has flowed into the gas-side end of the indoor heat exchanger 52 releases heat and condenses into a liquid refrigerant in the indoor heat exchanger 52 by exchanging heat with indoor air supplied by the indoor fan 53. The liquid refrigerant flows out of the liquid-side end of the indoor heat exchanger 52. The refrigerant that has flowed out of the liquid-side end of the indoor heat exchanger 52 flows to the liquid-refrigerant connection pipe 6 through the indoor liquid refrigerant pipe 58 and the indoor expansion valve 54. In the heating operation mode, the valve opening degree of the indoor expansion valve 54 is controlled to be fully opened.

In this way, the refrigerant flowing through the liquid-refrigerant connection pipe 6 flows into the outdoor expansion valve 24 through the liquid-side shutoff valve 29 and the outdoor liquid-side pipe 32.

The refrigerant that has flowed into the outdoor expansion valve 24 is decompressed until the refrigerant becomes a low-pressure refrigerant in the refrigeration cycle, and then flows into the liquid-side end of the outdoor heat exchanger 23. In the heating operation mode, the valve opening degree of the outdoor expansion valve 24 is controlled such that the degree of superheating of refrigerant sucked into the compressor 21 becomes equal to a predetermined degree of superheating.

The refrigerant that has flowed into the liquid-side end of the outdoor heat exchanger 23 evaporates into a gas refrigerant in the outdoor heat exchanger 23 by exchanging heat with outdoor air supplied by the outdoor fan 25. The gas refrigerant flows out of the gas-side end of the outdoor heat exchanger 23.

The refrigerant that has flowed out of the gas-side end of the outdoor heat exchanger 23 travels through the four-way switching valve 22 and the suction pipe 34, and is again sucked into the compressor 21.

(4) Refrigerant Leak Control Mode

Figure 5:
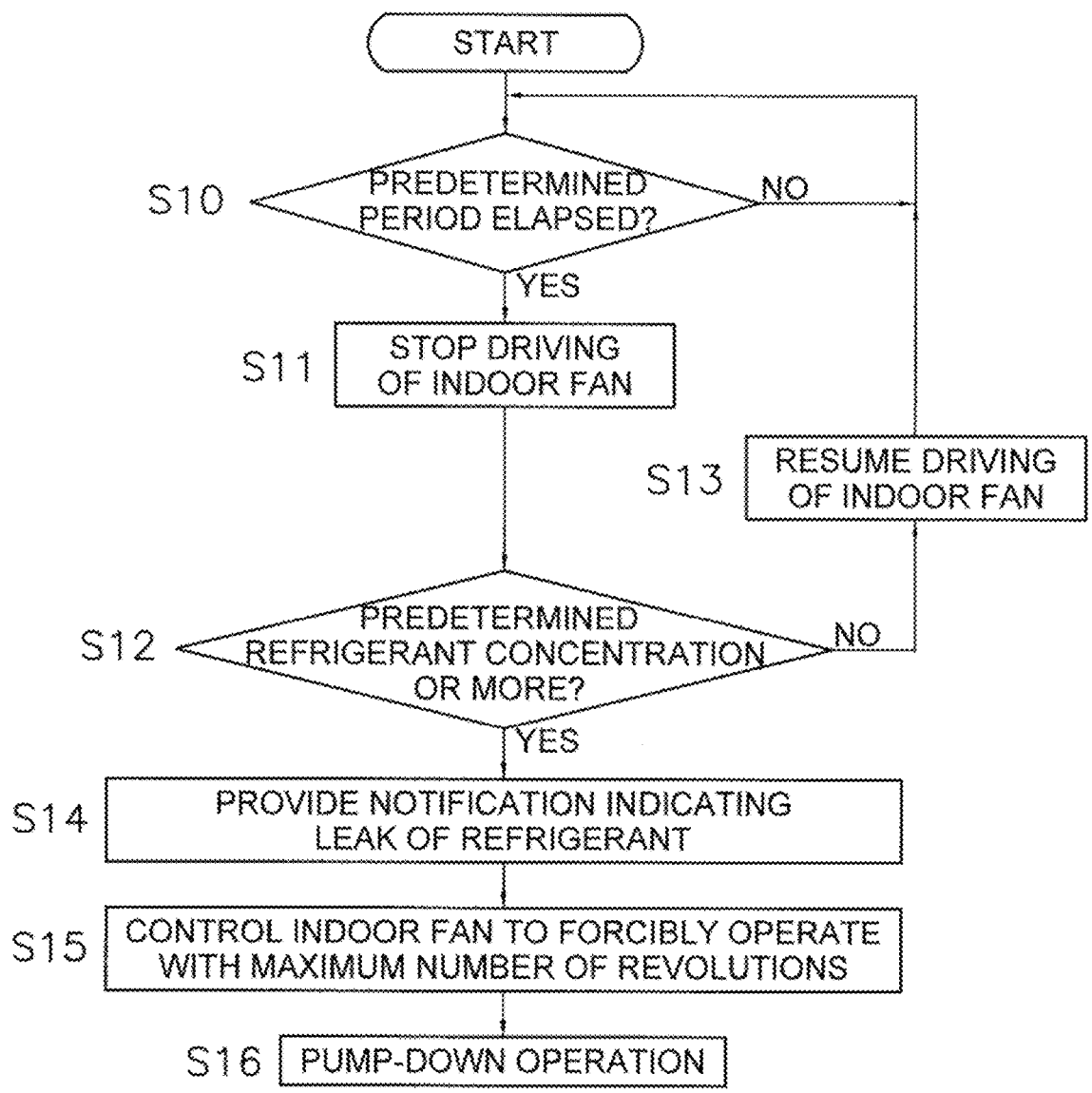
FIG. 5 is a flowchart illustrating an example process flow of the controller in a refrigerant leak control mode.

The following describes an example process flow for the refrigerant leak control mode, which is executed by the controller 70 when a refrigerant leak occurs in the normal operation mode with reference to a flowchart illustrated in FIG. 5.

In step S10, when the normal operation mode of the cooling operation mode or heating operation mode is being executed, the controller 70 determines whether a predetermined period has elapsed since the start of a cooling or heating operation or since the latest detection of the leaking refrigerant gas concentration. If it is determined that the predetermined period has elapsed, the process proceeds to step S11. If it is determined that the predetermined period has not elapsed, step S10 is repeatedly performed.

In step S11, the controller 70 temporarily stops the driving of the indoor fan 53 to reduce the air flow in the room R.

In step S12, the controller 70 determines whether the refrigerant concentration detected by the refrigerant gas sensor 81 is greater than or equal to a predetermined refrigerant concentration. The predetermined refrigerant concentration is determined in advance in accordance with the type of the refrigerant charged in the refrigerant circuit 10 (in this embodiment, R32) and is stored in the storage unit 71. If the controller 70 determines that the refrigerant concentration detected by the refrigerant gas sensor 81 is greater than or equal to the predetermined refrigerant concentration, the process proceeds to step S14. On the other hand, if the refrigerant concentration detected by the refrigerant gas sensor 81 is less than the predetermined refrigerant concentration, the process proceeds to step S13.

In step S13, the controller 70 resumes the driving of the indoor fan 53, which has been stopped, and returns to step S10, with the normal operation mode remaining continuously active.

In step S14, the controller 70 starts the refrigerant leak control mode and causes the output control unit 75 to display, on the display of the remote control 50a, information indicating a leak of refrigerant as text information. Further, the controller 70 causes the output control unit 75 to provide a notification indicating the leak of refrigerant as audio information from the speaker of the remote control 50a.

In step S15, the controller 70 controls the indoor fan 53 to forcibly operate with a maximum number of revolutions.

This allows the refrigerant that has leaked to be stirred and can suppress a local increase in concentration.

In step S16, a pump-down operation is performed. In the pump-down operation, while the connection state of the four-way switching valve 22 is set to the connection state in the cooling operation mode, the outdoor expansion valve 24 is closed, the compressor 21 is driven, the outdoor fan 25 is driven, and the outdoor heat exchanger 23 is caused to function as a condenser for refrigerant. Accordingly, within the refrigerant circuit 10, refrigerant present on the indoor unit 50 side is collected before the refrigerant reaches the outdoor expansion valve 24 from the discharge side of the compressor 21 of the outdoor unit 2 through the outdoor heat exchanger 23, thereby suppressing a further leak of refrigerant from a leak portion of the indoor unit 50. In a state where the cooling operation mode is executed during a leak of refrigerant, the pump-down operation is performed, with the connection state of the four-way switching valve 22 remaining unchanged. In a state where the heating operation mode is executed during a leak of refrigerant, in contrast, the pump-down operation is performed after the connection state of the four-way switching valve 22 is switched to that in the cooling operation mode. The pump-down operation is finished when the pressure detected by the suction pressure sensor 36 becomes less than or equal to a predetermined termination pressure. The driving of the compressor 21 is stopped, and the operation of the air conditioner 100 is stopped.

(5) Features (5-1)

In the indoor unit 50 of the air conditioner 100 according to this embodiment, the refrigerant gas sensor 81 is disposed in a position not included in an area through which the conditioned air F flows. This can prevent the refrigerant gas sensor 81 from coming into direct contact with the conditioned air flow, and thus can prevent condensation from forming on the refrigerant gas sensor 81 itself. Accordingly, the detection accuracy of the refrigerant gas sensor 81 can be enhanced.

(5-2)

If the refrigerant gas sensor 81 is to perform detection with the indoor fan 53 remaining driven when the air conditioner 100 is executing the normal operation mode, a refrigerant gas that has leaked is introduced into a space situated in front of and below the casing 60 of the indoor unit 50 so as to travel along the conditioned air flow F. To detect the leaking refrigerant with the indoor fan 53 remaining driven, the refrigerant gas sensor needs to be arranged in the area through which the conditioned air flow F travels. However, if the refrigerant gas sensor is arranged in the area through which the conditioned air flow F travels, as described above, condensation forms on the refrigerant gas sensor, which may make it difficult to perform accurate detection.

In this embodiment, in contrast, the refrigerant gas sensor 81 is arranged in an area below the bottom surface 63 of the casing 60 of the indoor unit 50, and, even when the normal operation mode is being executed, the refrigerant gas sensor 81 performs detection, with the air flow in the room R kept reduced while the driving of the indoor fan 53 is stopped.

In this way, the driving of the indoor fan 53 is stopped, and the air flow in the room R is kept reduced. Thus, R32, which is a refrigerant having a greater specific gravity than air and with which the refrigerant circuit 10 of the air conditioner 100 is filled, is not introduced into the conditioned air flow F and is likely to gather, when leaking, in an area below, rather than above, the casing 60 of the indoor unit 50 due to its weight. The refrigerant gas sensor 81, which is disposed in an area below the bottom surface 63, can thus more reliably detect a refrigerant leak.

(5-3)

In the air conditioner 100 according to this embodiment, if an ignition possibility has occurred due to a leak of refrigerant in the indoor unit 50, the pump-down operation is performed to collect the refrigerant in the outdoor unit 2. This can suppress a further leak of refrigerant from a leak portion of the indoor unit 50.

(5-4)

In the indoor unit 50 of the air conditioner 100 according to this embodiment, if it is determined that refrigerant has leaked, the indoor fan 53 is forcibly driven with a maximum number of revolutions. This can suppress the occurrence of a local increase in refrigerant concentration within a room.

(6) Modifications

The embodiment described above can be modified as appropriate, as given in the following modifications. Each of the modifications may be used in combination with any other modification so long as consistency is maintained.

(6-1) Modification A

In the embodiment described above, a case has been described as an example in which the refrigerant charged in the refrigerant circuit 10 is R32.

The refrigerant to be charged in the refrigerant circuit 10 is not limited to this, and examples of the refrigerant other than R32 may include flammable refrigerants classified in Class A3 of ASHRAE 34 Refrigerant Safety Classification, low flammable refrigerants classified in Class A2 of ASHRAE 34 Refrigerant Safety Classification, mildly flammable refrigerants classified in Class A2L of ASHRAE 34 Refrigerant Safety Classification, and highly toxic refrigerants classified in Class B of ASHRAE 34 Refrigerant Safety Classification.

Other examples of the refrigerant to be charged in the refrigerant circuit 10, other than R32, may include refrigerants with lower GWP than R32 (a natural refrigerant such as R717 and, R170, R1270, R290, R600, R600a, R152a, and a refrigerant mixture thereof).

(6-2) Modification B

Figure 6:
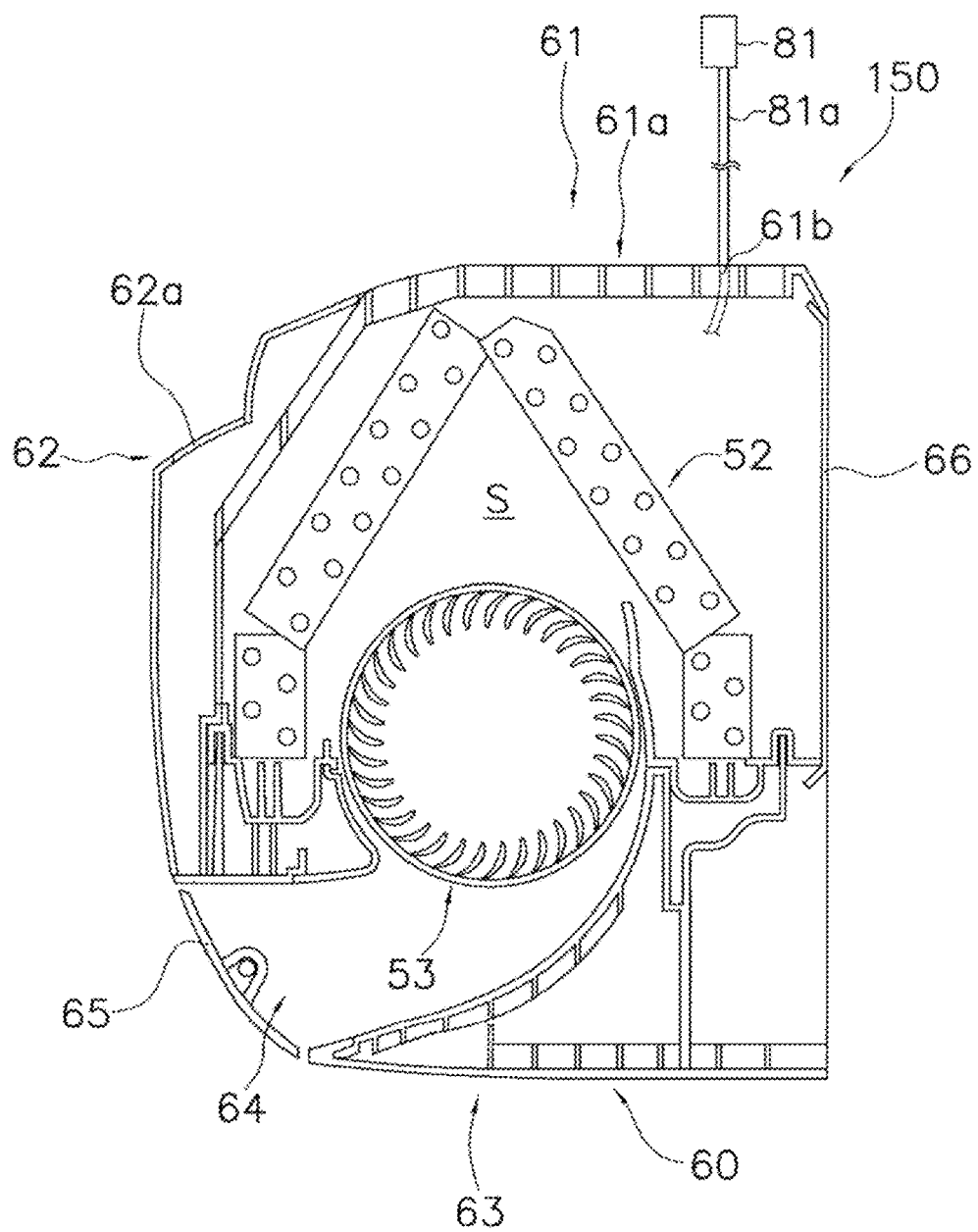
FIG. 6 is a sectional view of an indoor unit according to Modification B when viewed in side elevation.

When a refrigerant (e.g., a natural refrigerant such as R717) having a smaller specific gravity than air among the refrigerants other than R32 described in Modification A is used, for example, as in an indoor unit 150 illustrated in FIG. 6, the top surface 61 has an opening 61b through which the communication line 81a is allowed to extend, and the refrigerant gas sensor 81 is arranged and secured in a space above the top surface 61.

With this configuration, when leaking, any refrigerant that moves upward due to the smaller specific gravity than that of air can be more accurately detected. A process similar to that in the embodiment described above can be performed, and effects similar to those of the embodiment described above can be achieved.

(6-3) Modification C

In the embodiment described above, a case has been described as an example in which when the normal operation mode is being performed, the refrigerant gas sensor 81 performs detection, with the air flow in the room R suppressed by temporarily stopping the driving of the indoor fan 53.

Alternatively, for example, the controller 70 may be configured to be capable of determining a detection signal from the refrigerant gas sensor 81 even while the driving of the air conditioner 100 is stopped and capable of detecting a refrigerant leak even during stopped operation. When the air conditioner 100 is stopped, as in the case where the indoor fan 53 is temporarily stopped when the normal operation mode is being executed according to the embodiment described above, the air flow in the room R is kept reduced, resulting in accurate detection.

(6-4) Modification D

In the embodiment described above, a case has been described as an example in which the refrigerant gas sensor 81 is always secured to an area below the casing 60 of the indoor unit 50.

Figure 7:
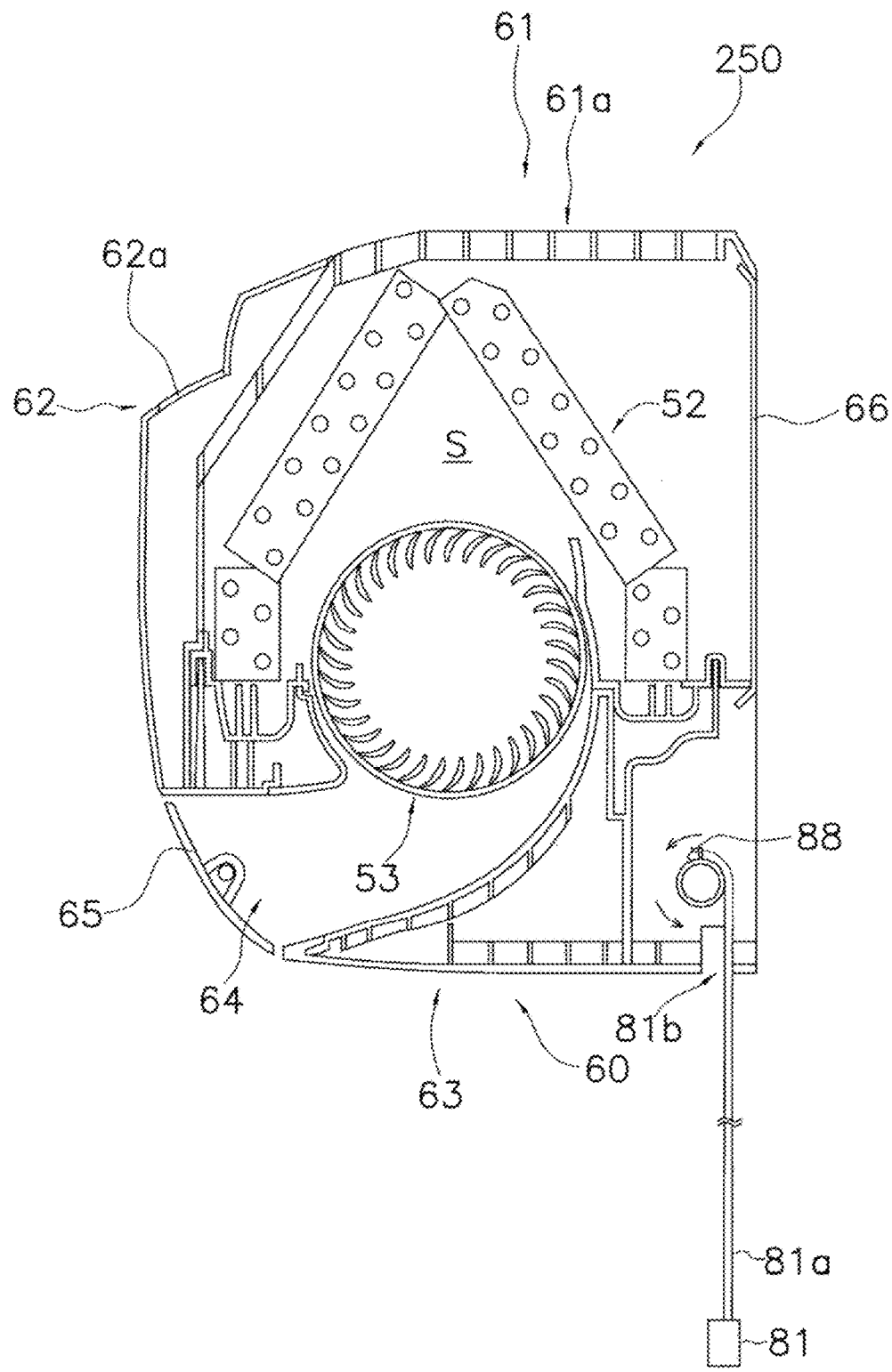
FIG. 7 is a sectional view of an indoor unit according to Modification D when viewed in side elevation.

Alternatively, for example, as in an indoor unit 250 illustrated in FIG. 7, a sensor raising and lowering mechanism 88 may be included to allow the refrigerant gas sensor 81 to move in the up-down direction.

Figure 8:
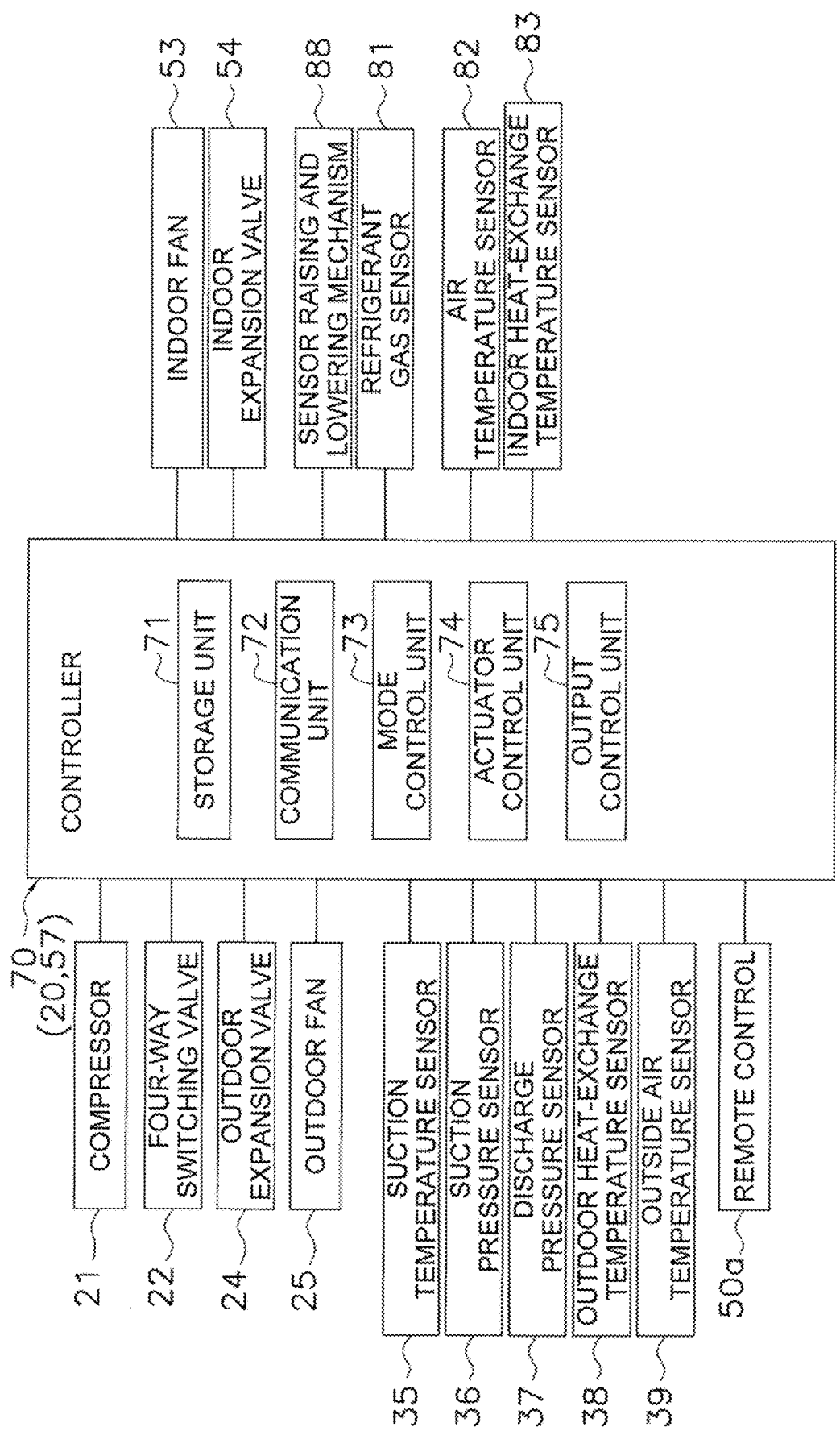
FIG. 8 is a block diagram schematically illustrating the general configuration of a controller of an air conditioner according to Modification D and components connected to the controller.

The sensor raising and lowering mechanism 88 is electrically connected to the indoor-unit control unit 57. With the configuration illustrated in FIG. 8, the driving of the sensor raising and lowering mechanism 88 is controlled by the actuator control unit 74 of the controller 70. Specifically, to raise the refrigerant gas sensor 81, which has been lowered, the sensor raising and lowering mechanism 88 is driven to hoist the communication line 81a up and raise the refrigerant gas sensor 81 until the refrigerant gas sensor 81 is placed in an accommodation position 81b at the bottom surface 63. To lower the refrigerant gas sensor 81 placed in the accommodation position 81b, the sensor raising and lowering mechanism 88 is driven to loose the communication line 81a and lower the refrigerant gas sensor 81 to a predetermined position 30 mm or more and 300 mm or less below the bottom surface 63.

Figure 9:
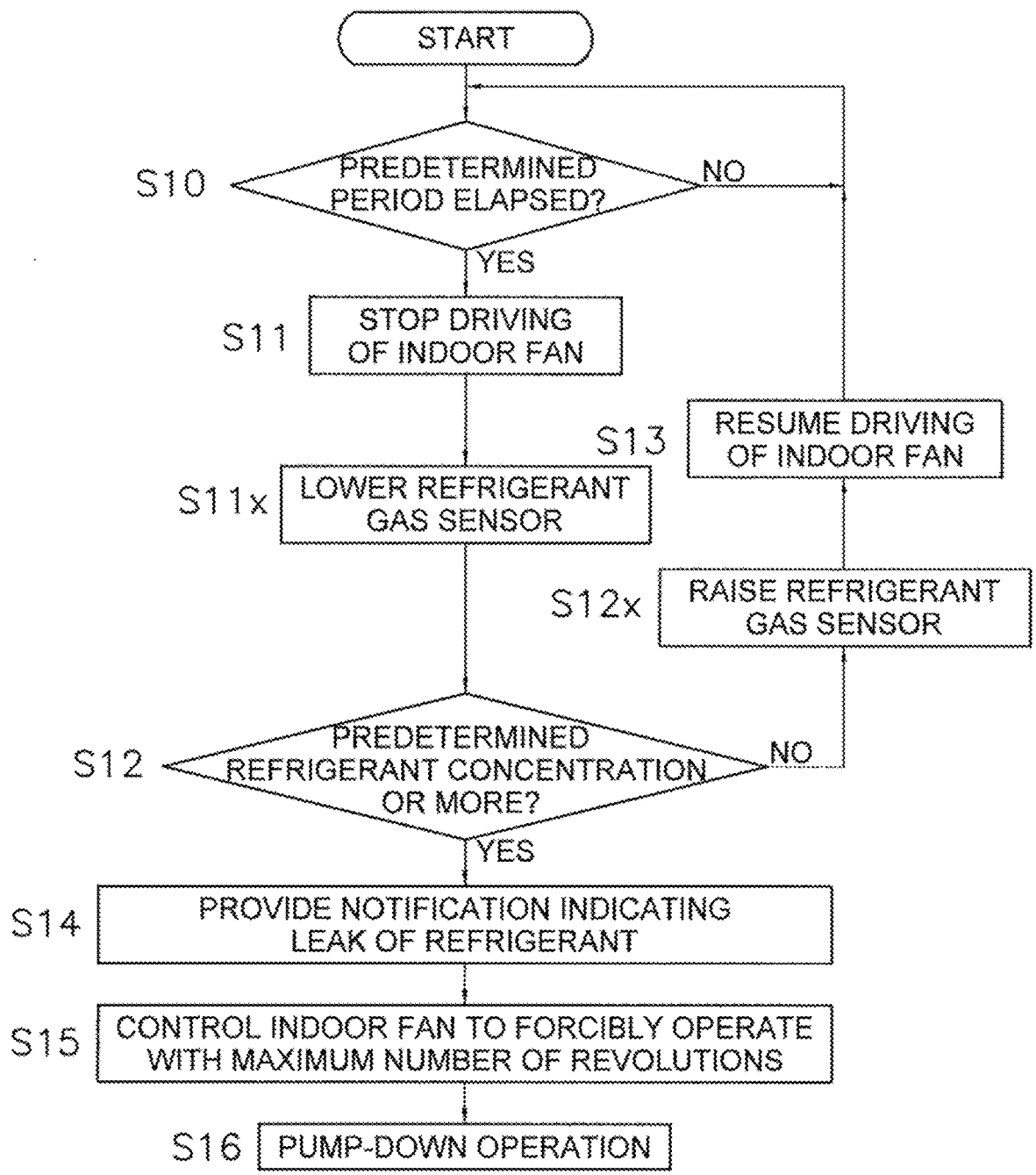
FIG. 9 is a flowchart illustrating an example process flow of the controller in a refrigerant leak control mode according to Modification D.

A process for raising and lowering the refrigerant gas sensor 81 for use is also performed by, as in the embodiment described above, as illustrated in FIG. 9, executing step S11x between steps S11 and S12 according to the embodiment described above to lower the refrigerant gas sensor 81, and executing step S12x between step S12 and step S13 to raise the refrigerant gas sensor 81. Accordingly, effects similar to those of the embodiment described above can be achieved. Since the refrigerant gas sensor 81 can be accommodated, a neat appearance can be obtained.

(6-5) Modification E

In the embodiment described above, a case has been described as an example in which a notification indicating that refrigerant has leaked is provided by displaying text information on the display of the remote control 50a and by using audio information from the speaker of the remote control 50a.

However, the type of notification is not limited to these. For example, when the remote control 50a is provided with a lamp, the lamp may be turned on or made to blink. When a notification is provided by using a lamp, the notification may be provided in a different way by changing the amount of emission of light, the blinking speed, or the like such that illumination for which a normal condition without a refrigerant leak is determined is different from illumination for which it is determined that refrigerant has leaked.

When the controller 70 is connected to an external remote monitoring device or the like, which is constituted by a computer, via the communication unit 72 so that they can communicate with each other over a communication network, the controller 70 may transmit information indicating that refrigerant has leaked to the external remote monitoring device or the like. In this case, a service engineer who specializes in taking countermeasures against refrigerant leaks that are being monitored in the remote monitoring device can also be appropriately informed of the situation.

(6-6) Modification F

In the embodiment described above, a case has been described as an example in which in the refrigerant leak control mode, a pump-down operation is finally performed to stop the air conditioner 100.

However, the control of the air conditioner 100 in the refrigerant leak control mode is not limited to this. For example, control may be performed to reduce the frequency of the compressor 21, compared to the current situation, after a leak. If refrigerant leaks during the execution of the cooling operation mode, the indoor expansion valve 54 may be closed so as not to supply further refrigerant to the indoor heat exchanger 52.

(6-7) Modification G

In the embodiment described above, the air conditioner 100 has been described as an example in which the indoor unit 50 and the outdoor unit 2 are separately arranged in remote locations.

Alternatively, an air conditioner may be configured such that the internal components of the indoor unit 50 and the internal components of the outdoor unit 2 according to the embodiment described above are housed in a single housing, and may be used in such a manner that the single housing is mounted over the indoor side and the outdoor side.

(6-8) Modification H

In the embodiment described above, a case has been described as an example in which if refrigerant leaks, the indoor fan 53 is controlled to forcibly operate with a maximum number of revolutions.

Alternatively, for example, a controller of ventilation equipment, which is installed in the building separately from the air conditioner 100, and the controller 70 of the air conditioner 100 are configured to be capable of communicating with each other, and, when the indoor fan 53 is caused to forcibly operate if refrigerant leaks, a fan included in the ventilation equipment may also be caused to forcibly operate at the same time.

While an embodiment of the present disclosure has been described, it should be understood that configurations and details can be modified in various ways without departing from the gist and scope of the present disclosure as defined in the claims.

REFERENCE SIGNS LIST 2 outdoor unit
10 refrigerant circuit
20 outdoor-unit control unit
21 compressor
23 outdoor heat exchanger
24 outdoor expansion valve
50 indoor unit
52 indoor heat exchanger
53 indoor fan (fan)
54 indoor expansion valve
57 indoor-unit control unit
60 casing
61 top surface (upper surface)
63 bottom surface (lower surface)
64 blow-out port
70 controller (control unit)
81 refrigerant gas sensor
81a communication line
82 air temperature sensor
83 indoor heat-exchange temperature sensor
88 sensor raising and lowering mechanism (raising and lowering mechanism)

100 air conditioner (refrigeration apparatus)
150 indoor unit
250 indoor unit
R room

CITATION LIST

Patent Literature

Patent Literature 1: Japanese Unexamined Patent Application Publication No. 2016-90109

The invention claimed is:

1. An indoor unit for a refrigeration apparatus including a refrigerant circuit that has refrigerant charged therein and that performs a refrigeration cycle, the indoor unit for the refrigeration apparatus comprising:
    a casing that houses at least a portion of the refrigerant circuit, the casing having a blow-out port with an opening that opens in a direction other than an up-down direction;
    a fan that is housed in the casing and that generates an air flow directed from the blow-out port to outside the casing; and
    a refrigerant gas sensor capable of detecting a refrigerant gas below a lower surface of the casing or above an upper surface of the casing,
    wherein the direction of the opening in the blow-out port prevents direct contact between the air flow from the blow-out port that is outside the casing and the refrigerant gas sensor.

2. The indoor unit for the refrigeration apparatus according to claim 1, wherein
    the refrigerant charged in the refrigerant circuit is a single-component refrigerant that is one of a flammable refrigerant, a low flammable refrigerant, a mildly flammable refrigerant, and a highly toxic refrigerant, or a refrigerant mixture of two or more thereof.

3. The indoor unit for the refrigeration apparatus according to claim 1, wherein
    the refrigerant charged in the refrigerant circuit is R32 or a refrigerant with lower GWP than R32.

4. The indoor unit for the refrigeration apparatus according to claim 1, wherein
    the refrigerant gas sensor detects a refrigerant gas in an area ranging from 30 mm to 300 mm below the lower surface of the casing, and
    the indoor unit for the refrigeration apparatus is used with the casing secured to a wall surface of a room.

5. The indoor unit of the refrigeration apparatus according to claim 4, wherein
    the refrigerant gas sensor is secured in an area ranging from 30 mm to 300 mm below the lower surface of the casing.

6. The indoor unit for the refrigeration apparatus according to claim 4, further comprising
    a processor that causes the refrigerant gas sensor to detect a refrigerant gas while stopping driving of the fan.

7. The indoor unit of the refrigeration apparatus according to claim 6, further comprising
    a raising and lowering actuator for allowing the refrigerant gas sensor to move downward from the lower surface of the casing and into the casing, wherein
    the processor causes the raising and lowering actuator to lower the refrigerant gas sensor to a position 30 mm or more and 300 mm or less below the lower surface of the casing while stopping the driving of the fan, and causes the refrigerant gas sensor to detect a refrigerant gas.

8. An indoor unit for a refrigeration apparatus including a refrigerant circuit that has refrigerant charged therein and that performs a refrigeration cycle, the indoor unit for the refrigeration apparatus comprising:
    a casing that houses at least a portion of the refrigerant circuit, the casing having a blow-out port that opens in a direction other than an up-down direction;
    a fan that is housed in the casing and that generates an air flow directed from the blow-out port to outside the casing;
    a refrigerant gas sensor capable of detecting a refrigerant gas below a lower surface of the casing or above an upper surface of the casing;
    a processor that causes the refrigerant gas sensor to detect a refrigerant gas while stopping driving of the fan; and
    a raising and lowering actuator for allowing the refrigerant gas sensor to move downward from the lower surface of the casing and into the casing, wherein
    the refrigerant gas sensor detects a refrigerant gas in an area ranging from 30 mm to 300 mm below the lower surface of the casing,
    the indoor unit for the refrigeration apparatus is used with the casing secured to a wall surface of a room (R), and
    the processor causes the raising and lowering actuator to lower the refrigerant gas sensor to a position 30 mm or more and 300 mm or less below the lower surface of the casing while stopping the driving of the fan, and causes the refrigerant gas sensor to detect a refrigerant gas.

* * * * *